United States Patent
Liao et al.

(10) Patent No.: US 9,716,879 B2
(45) Date of Patent: Jul. 25, 2017

(54) IMAGE DISPLAY METHOD AND DEVICE FOR MULTI-VIEW STEREOSCOPIC DISPLAY

(71) Applicant: Shenzhen China Star Optoelectronics Technology Co., Ltd., Shenzhen, Guangdong (CN)

(72) Inventors: Qiaosheng Liao, Guangdong (CN); Zhiming Yang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 340 days.

(21) Appl. No.: 14/376,673

(22) PCT Filed: Jul. 22, 2014

(86) PCT No.: PCT/CN2014/082706
§ 371 (c)(1),
(2) Date: Aug. 5, 2014

(87) PCT Pub. No.: WO2016/008166
PCT Pub. Date: Jan. 21, 2016

(65) Prior Publication Data
US 2016/0021364 A1    Jan. 21, 2016

(30) Foreign Application Priority Data
Jul. 15, 2014   (CN) .......................... 2014 1 03375061

(51) Int. Cl.
H04N 13/04        (2006.01)
(52) U.S. Cl.
CPC ..... *H04N 13/0497* (2013.01); *H04N 13/0402* (2013.01); *H04N 13/0447* (2013.01); *H04N 13/0477* (2013.01)

(58) Field of Classification Search
None
See application file for complete search history.

(56) References Cited

U.S. PATENT DOCUMENTS

2009/0073556 A1* 3/2009 Bent-Gourley .... G02B 27/2214
                                                    359/463
2009/0079818 A1* 3/2009 Saishu ................. G03B 35/00
                                                    348/51

(Continued)

FOREIGN PATENT DOCUMENTS

| CN | 102305979 A | 1/2012 |
| CN | 102547348 A | 7/2012 |
| CN | 102572484 A | 7/2012 |

OTHER PUBLICATIONS

English translation of CN 102572484.*

(Continued)

*Primary Examiner* — Jeremiah C Hallenbeck-Huber
*Assistant Examiner* — Stefan Gadomski
(74) *Attorney, Agent, or Firm* — Andrew C. Cheng

(57) ABSTRACT

A multi-view stereoscopic display includes multiple viewing areas periodically disposed along a horizontal direction, and each of the multiple viewing areas includes multiple viewpoints. The method comprises obtaining a position of a viewer, determining that if the viewer is located in an inversion region, and if the position of the viewer is located in the inversion region, executing a preset process for left and right eye viewpoint images of the viewpoints respectively corresponding to the viewer's left eye and right eyes so as to decrease the brightness contrast of the left eye and the right eye viewpoint images in order to reduce the discomfort of the viewer for watching in the inversion region and adding the comfort of watching the stereoscopic image.

1 Claim, 3 Drawing Sheets

(56) References Cited

U.S. PATENT DOCUMENTS

| | | | | |
|---|---|---|---|---|
| 2010/0007721 A1* | 1/2010 | Kim | H04N 13/0447 | 348/51 |
| 2010/0182688 A1* | 7/2010 | Kim | G02B 27/0093 | 359/465 |
| 2011/0181706 A1* | 7/2011 | Harrold | H04N 13/0497 | 348/51 |
| 2011/0285700 A1* | 11/2011 | Kim | G02B 27/0093 | 345/419 |
| 2012/0044330 A1* | 2/2012 | Watanabe | G02B 27/2214 | 348/54 |
| 2012/0154394 A1* | 6/2012 | Horikoshi | G09G 3/003 | 345/419 |
| 2012/0206445 A1* | 8/2012 | Chiba | H04N 13/0413 | 345/419 |
| 2013/0027909 A1* | 1/2013 | Kim | G02F 1/133603 | 362/97.2 |
| 2013/0181895 A1* | 7/2013 | Kim | H04N 13/0418 | 345/156 |
| 2013/0293793 A1* | 11/2013 | Lu | G02B 27/2214 | 349/15 |
| 2014/0035972 A1* | 2/2014 | Hasegawa | H04N 13/0468 | 345/694 |
| 2014/0085296 A1* | 3/2014 | Baik | H04N 13/0033 | 345/419 |
| 2014/0125957 A1* | 5/2014 | Lee | G02B 27/2264 | 353/37 |
| 2014/0232837 A1* | 8/2014 | Kim | H04N 13/0409 | 348/59 |
| 2014/0268324 A1* | 9/2014 | Rosenthal | G02B 27/2214 | 359/462 |
| 2014/0306879 A1* | 10/2014 | Oka | G06F 3/013 | 345/156 |
| 2015/0015681 A1* | 1/2015 | Kim | G02B 27/2214 | 348/51 |
| 2015/0015686 A1* | 1/2015 | de La Barr | H04N 13/0404 | 348/59 |
| 2015/0029317 A1* | 1/2015 | Kim | G02B 27/2214 | 348/59 |
| 2015/0042770 A1* | 2/2015 | Barenbrug | H04N 13/0447 | 348/51 |
| 2015/0049176 A1* | 2/2015 | Hinnen | H04N 13/007 | 348/59 |
| 2015/0092026 A1* | 4/2015 | Baik | H04N 13/0018 | 348/54 |
| 2015/0304644 A1* | 10/2015 | Kim | H04N 13/0447 | 348/54 |

OTHER PUBLICATIONS

Bao et al. "Multi-observers tracking autostereoscopic display using parallax barrier" Journal of the Institute of Image Electronics Engineers of Japan, vol. 32, issue 5, 2003.*

Y. Zhu and T. Zhen, "3D Multi-view Autostereoscopic Display and Its Key Technologie," 2009 Asia-Pacific Conference on Information Processing, Shenzhen, 2009, pp. 31-35. doi: 10.1109/APCIP.2009.144.*

* cited by examiner

IMAGE DISPLAY METHOD AND DEVICE FOR MULTI-VIEW STEREOSCOPIC DISPLAY

BACKGROUND OF THE INVENTION

1. Field of the Invention

The present invention relates to a stereoscopic display field, and more particularly to an image display method and device for multi-view stereoscopic display.

2. Description of Related Art

Recently, with the stereoscopic display technology is widely used in various fields, the stereoscopic display technology is more and more attractive. With reference to FIG. 4, the multi-view display technology can provide multiple viewpoints in a viewing space such that a viewer can enjoy a certain freedom to watch. Meanwhile, the multi-view display technology will form a plurality of repeated viewing areas in the viewing space. Wherein, each viewing area includes multiple viewpoints. When a viewer moves horizontally in the repeated viewing areas, because an average distance between the viewer's left and right eyes is about 65 mm, the viewer will across multiple viewpoints in a viewing area. When the viewer's left eye is located at a first viewpoint, the viewer's right eye maybe locates at a seventh viewpoint. When the position of the viewer is located at an inversion region, the difference between a viewpoint image corresponding to the viewer's left eye and a viewpoint image corresponding to the viewer's right eye is increased sharply such that the viewer can not only feel a normal stereoscopic image but also feel an unexpected and strong inversion sight stimulate, which greatly reducing the comfort of the viewer.

SUMMARY OF THE INVENTION

The main technology problems solved by the present invention is to provide an image display method and device for multi-view stereoscopic display capable of reducing the discomfort of the viewer in the inversion region and adding the comfort of watching the stereoscopic image.

In order to solve the above problems, a technology solution provided by the present invention is: an image display method for a multi-view stereoscopic display, wherein, the multi-view stereoscopic display includes multiple viewing areas periodically disposed along a horizontal direction; each of the multiple viewing areas includes multiple viewpoints and the number of the multiple viewpoints is the same in the each viewing area, the method comprising: obtaining a position of a viewer; determining that if the position of the viewer is located in an inversion region, wherein, the inversion region is the position of the viewer that the viewpoint corresponding to the viewer's left eye and the viewpoint corresponding to the viewer's right eye are respectively located in the adjacent viewing areas; and If the position of the viewer is located in the inversion region, executing a preset processing for a left eye viewpoint image of the viewpoint corresponding to the viewer's left eye and a right eye viewpoint image of the viewpoint corresponding to the viewer's right eye so as to decrease a brightness contrast of the left eye viewpoint image and the right eye viewpoint image; wherein, the viewpoints in each viewing area are sequentially assigned a serial number; the step of executing a preset processing for a left eye viewpoint image of the viewpoint corresponding to the viewer's left eye and a right eye viewpoint image of the viewpoint corresponding to the viewer's right eye is: respectively obtaining series numbers of the viewing points corresponding to viewer's left eye and right eye, and averaging the two series numbers as a serial number of a middle viewpoint; after respectively decreasing brightness values of the left eye viewpoint image and the right eye viewpoint image by a preset ratio, compensating the brightness values of the left eye viewpoint image and the right eye viewpoint image with a brightness value of the preset ratio of a middle viewpoint image corresponding to the serial number of the middle viewpoint; and wherein, the preset ratio ranges from 1% to 20%.

In order to solve the above problems, another technology solution provided by the present invention is: an image display method for a multi-view stereoscopic display, wherein, the multi-view stereoscopic display includes multiple viewing areas periodically disposed along a horizontal direction; each of the multiple viewing areas includes multiple viewpoints and the number of the multiple viewpoints is the same in the each viewing area, the method comprising: obtaining a position of a viewer; determining that if the position of the viewer is located in an inversion region, wherein, the inversion region is the position of the viewer that the viewpoint corresponding to the viewer's left eye and the viewpoint corresponding to the viewer's right eye are respectively located in the adjacent viewing areas; and If the position of the viewer is located in the inversion region, executing a preset processing for a left eye viewpoint image of the viewpoint corresponding to the viewer's left eye and a right eye viewpoint image of the viewpoint corresponding to the viewer's right eye so as to decrease a brightness contrast of the left eye viewpoint image and the right eye viewpoint image.

Wherein, the step of executing a preset processing for a left eye viewpoint image of the viewpoint corresponding to the viewer's left eye and a right eye viewpoint image of the viewpoint corresponding to the viewer's right eye is: decreasing brightness values of the left eye viewpoint image and the right eye viewpoint image.

Wherein, the viewpoints in each viewing area are sequentially assigned a serial number; the step of decreasing brightness values of the left eye viewpoint image and the right eye viewpoint image is: respectively obtaining series numbers of the viewing points corresponding to viewer's left eye and right eye, and obtaining a serial number of a middle viewpoint between the two series numbers of the viewing points corresponding to viewer's left eye and right eye; and after respectively decreasing the brightness values of the left eye viewpoint image and the right eye viewpoint image by a preset ratio, compensating the brightness values of the left eye viewpoint image and the right eye viewpoint image with a brightness value of the preset ratio of a middle viewpoint image corresponding to the serial number of the middle viewpoint.

Wherein, the preset ratio ranges from 1% to 20%.

Wherein, the step of respectively obtaining series numbers of the viewing points corresponding to viewer's left eye and right eye, and obtaining a serial number of a middle viewpoint between the two series numbers of the viewing points corresponding to viewer's left eye and right eye is: averaging the two series numbers as the serial number of the middle viewpoint.

In order to solve the above problems, another technology solution provided by the present invention is: an image display device for a multi-view stereoscopic display, wherein, the multi-view stereoscopic display includes multiple viewing areas periodically disposed along a horizontal direction; each of the multiple viewing areas includes multiple viewpoints and the number of the multiple viewpoints is the same in the each viewing area, the device comprising: an acquisition module for obtaining a position of a viewer; a determination module for determining that if the position of the viewer is located in an inversion region, wherein, the inversion region is the position of the viewer that the viewpoint corresponding to the viewer's left eye and the viewpoint corresponding to the viewer's right eye are respectively located in the adjacent viewing areas; and a processing module for executing a preset process for a left eye viewpoint image of the viewpoint corresponding to the viewer's left eye and a right eye viewpoint image of the viewpoint corresponding to the viewer's right eye when the determination module determines that the position of the viewer is located in the inversion region so as to decrease a brightness contrast of the left eye viewpoint image and the right eye viewpoint image.

Wherein, the processing module is used for respectively decreasing brightness values of the left eye viewpoint image and the right eye viewpoint image.

Wherein, the viewpoints in each viewing area are sequentially assigned a serial number; the processing module further comprising: a middle serial number obtaining module for respectively obtaining series numbers of the viewing points corresponding to the viewer's left eye and right eye, and obtaining a serial number of a middle viewpoint selected between the series numbers of the viewing points corresponding to the viewer's left eye and right eye; and a processing unit for after respectively decreasing brightness values of the left eye viewpoint image and the right eye viewpoint image by a preset ratio, compensating the left eye viewpoint image and the right eye viewpoint image with a brightness value of the preset ratio of a middle viewpoint image corresponding to the serial number of the middle viewpoint.

Wherein, the middle serial number obtaining module is used for averaging the series numbers of the viewing points corresponding to the viewer's left eye and right eye as the series number of the middle viewpoint.

The beneficial effects of the invention are: comparing to the prior art, the image display method and device for multi-view stereoscopic display of the present invention through obtaining a position of a viewer, determining that if the viewer is located in an inversion region, and if the position of the viewer is located in the inversion region, executing a preset process for a left eye viewpoint image of the viewpoint corresponding to the viewer's left eye and a right eye viewpoint image of the viewpoint corresponding to the viewer's right eye so as to decrease the brightness contrast of the left eye viewpoint image and the right eye viewpoint image in order to reduce the discomfort of the viewer for watching in the inversion region and adding the comfort of watching the stereoscopic image.

DETAILED DESCRIPTION OF THE PREFERRED EMBODIMENT

Preferred embodiments are described below with reference to the drawings.

Figure 1:
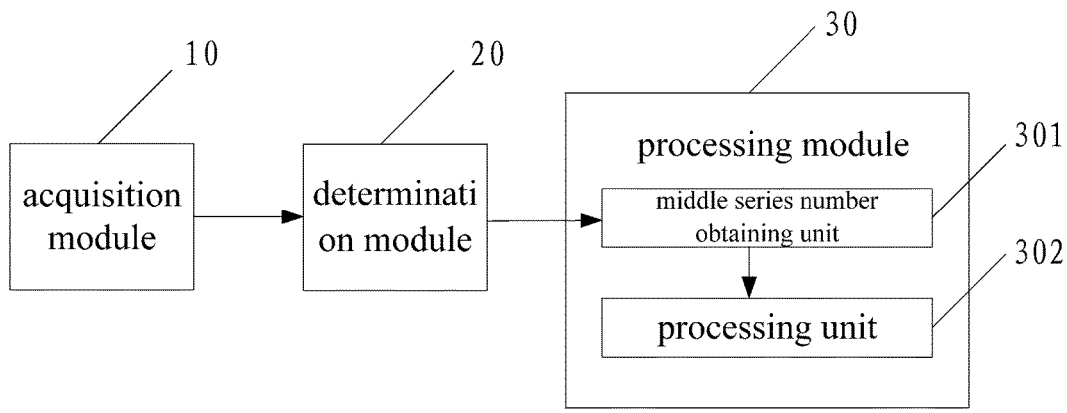
FIG. 1 is a schematic block diagram of an image display device for a multi-view stereoscopic display according to an embodiment of the present invention.

FIG. 1 is a schematic block diagram of an image display device for a multi-view stereoscopic display according to an embodiment of the present invention. Wherein, the multi-view stereoscopic display includes multiple viewing areas periodically disposed along a horizontal direction. Each of the multiple viewing areas includes multiple viewpoints and the number of the multiple viewpoints is the same in each viewing area. As shown in FIG. 1, the image display device includes an acquisition module 10, a determination module 20 and a processing module 30.

The acquisition module 10 is used for obtaining a position of a viewer.

The determination module 20 is connected with the acquisition module 10, and determining that if the viewer is located in an inversion region. Wherein, the inversion region the position of the viewer when the viewpoint corresponding to the viewer's left eye and the viewpoint corresponding to the viewer's right eye are respectively located in adjacent viewing areas.

The processing module 30 is connected with the determination module 20. The processing module 30 is used for executing a preset process for a left eye viewpoint image of the viewpoint corresponding to the viewer's left eye and a right eye viewpoint image of the viewpoint corresponding to the viewer's right eye in order to decrease the brightness contrast of the left eye viewpoint image and the right eye viewpoint image when the position of the viewer is located in the inversion region.

Specifically, the processing module 30 includes a middle number obtaining unit 301 and processing unit 302. Wherein, the middle number obtaining unit 301 is connected with the determination module 20. The middle number obtaining unit 301 is used for obtaining serial numbers of viewpoints respectively corresponding to the viewer's left and right eyes, and obtaining a serial number of a middle viewpoint between the two serial numbers of the viewpoints respectively corresponding to the viewer's left and right eyes. Wherein, the viewpoints in each viewing area are sequentially assigned a serial number. Preferably, the middle number obtaining unit 301 averages the two serial numbers of the viewpoints respectively corresponding to the viewer's left and right eyes as the series number of the middle viewpoint.

The processing unit 302 connects with the middle number obtaining unit 301. The processing unit 302 is used for decreasing brightness values of the left eye viewpoint image and the right eye viewpoint image by a preset ratio, and compensating a brightness value of the preset ratio of a middle viewpoint image corresponding to the serial number of the middle viewpoint in order to decrease the brightness contrast of the left eye viewpoint image and the right eye viewpoint image. Preferably, the preset ratio ranges from 1% to 20%.

Figure 2:
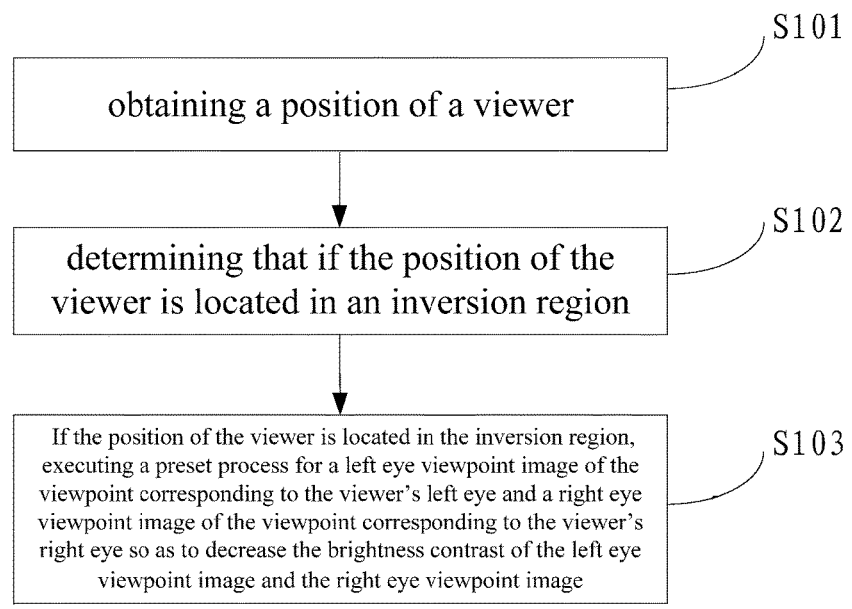
FIG. 2 is a flowchart of an image display method for a multi-view stereoscopic display device according to a first embodiment of the present invention.

FIG. 2 is a flowchart of an image display method for a multi-view stereoscopic display device according to a first embodiment of the present invention. As shown in FIG. 2, the method comprises the following steps:

Step S101: obtaining a position of a viewer.

In the step S101, the multi-view stereoscopic display is periodically disposed with multiple viewing areas along a horizontal direction; each of the multiple viewing areas includes multiple viewpoints and the number of the multiple viewpoints is the same in each viewing area; wherein, in the step of obtaining a position of a viewer is specifically: respectively obtaining the viewing areas containing the viewpoints corresponding to the viewer's left and right eyes.

Step S102: determining that if the position of the viewer is located in an inversion region.

In the step S102, the inversion region is the position of the viewer that the viewpoint corresponding to the viewer's left eye and the viewpoint corresponding to the viewer's right eye are located in the adjacent viewing areas. If the viewpoint corresponding to the viewer's left eye and the viewpoint corresponding to the viewer's right eye are respectively located in the adjacent viewing areas, determining that the position of the viewer is located in the inversion region. If the viewpoint corresponding to the viewer's left eye and the viewpoint corresponding to the viewer's right eye are located in the same viewing area, the position of the viewer is located in a normal region.

Step S103: If the position of the viewer is located in the inversion region, executing a preset process for a left eye viewpoint image of the viewpoint corresponding to the viewer's left eye and a right eye viewpoint image of the viewpoint corresponding to the viewer's right eye so as to decrease the brightness contrast of the left eye viewpoint image and the right eye viewpoint image.

In the step S103, when the step S102 determines that the position of the viewer is located in the inversion region, respectively obtaining viewpoint images of the viewpoints corresponding to viewer's left and right eyes, and denoting as the left eye viewpoint image and the right eye viewpoint image. Then, executing a preset process for brightness values of the left eye viewpoint image and the right eye viewpoint image so as to decrease the brightness contrast of the left eye viewpoint image and the right eye viewpoint image in order to reduce the discomfort of the viewer in the inversion region and adding the comfort of watching the stereoscopic image.

Preferably, executing the preset process for the brightness values of the left eye viewpoint image and the right eye viewpoint image is specifically: decreasing the brightness values of the left eye viewpoint image and the right eye viewpoint image in order to decrease the brightness contrast of the left eye viewpoint image and the right eye viewpoint image.

The first embodiment of the present invention decreases the brightness contrast through executing the preset process for the brightness values of the left eye viewpoint image and the right eye viewpoint image so as to reduce the discomfort of the viewer for watching in the inversion region and adding the comfort of watching the stereoscopic image.

Figure 3:
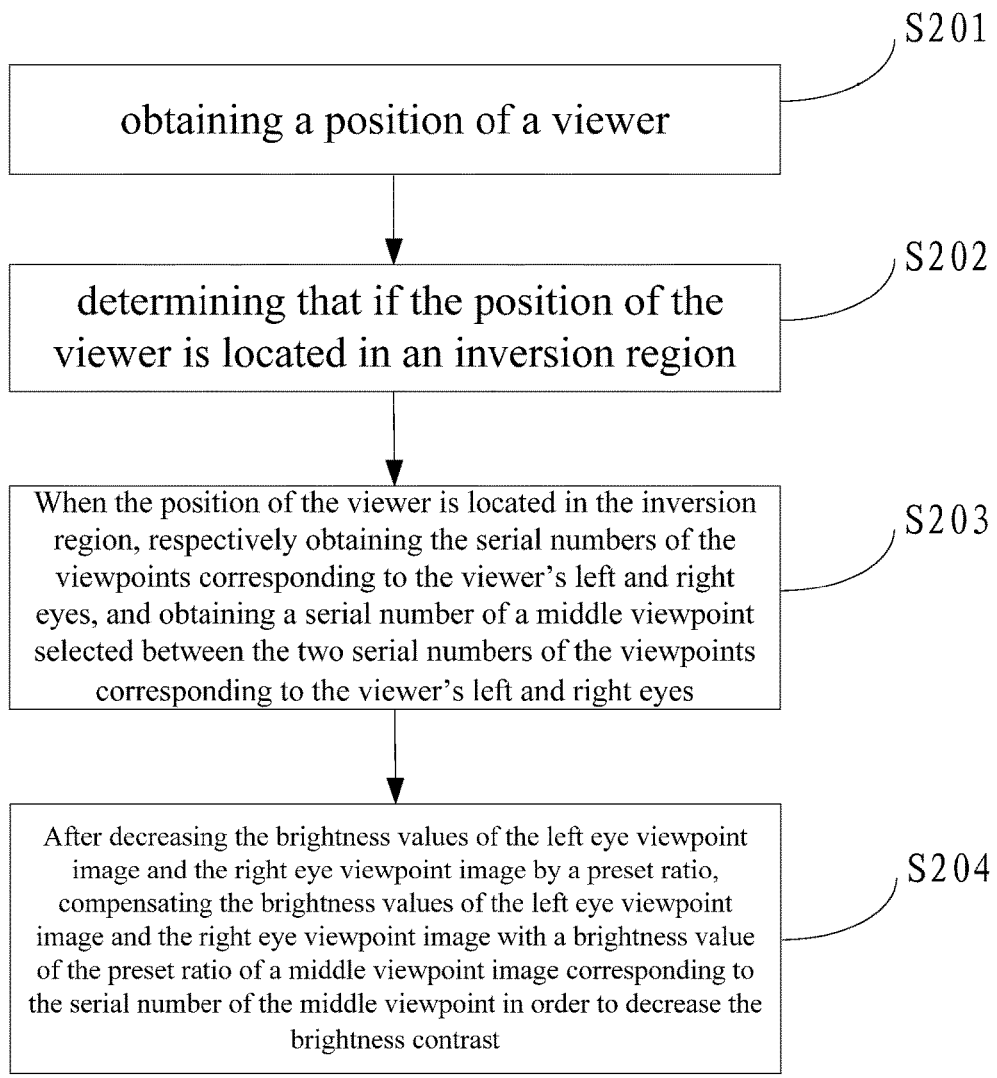
FIG. 3 is a flowchart of an image display method for a multi-view stereoscopic display device according to a second embodiment of the present invention.
Figure 4:
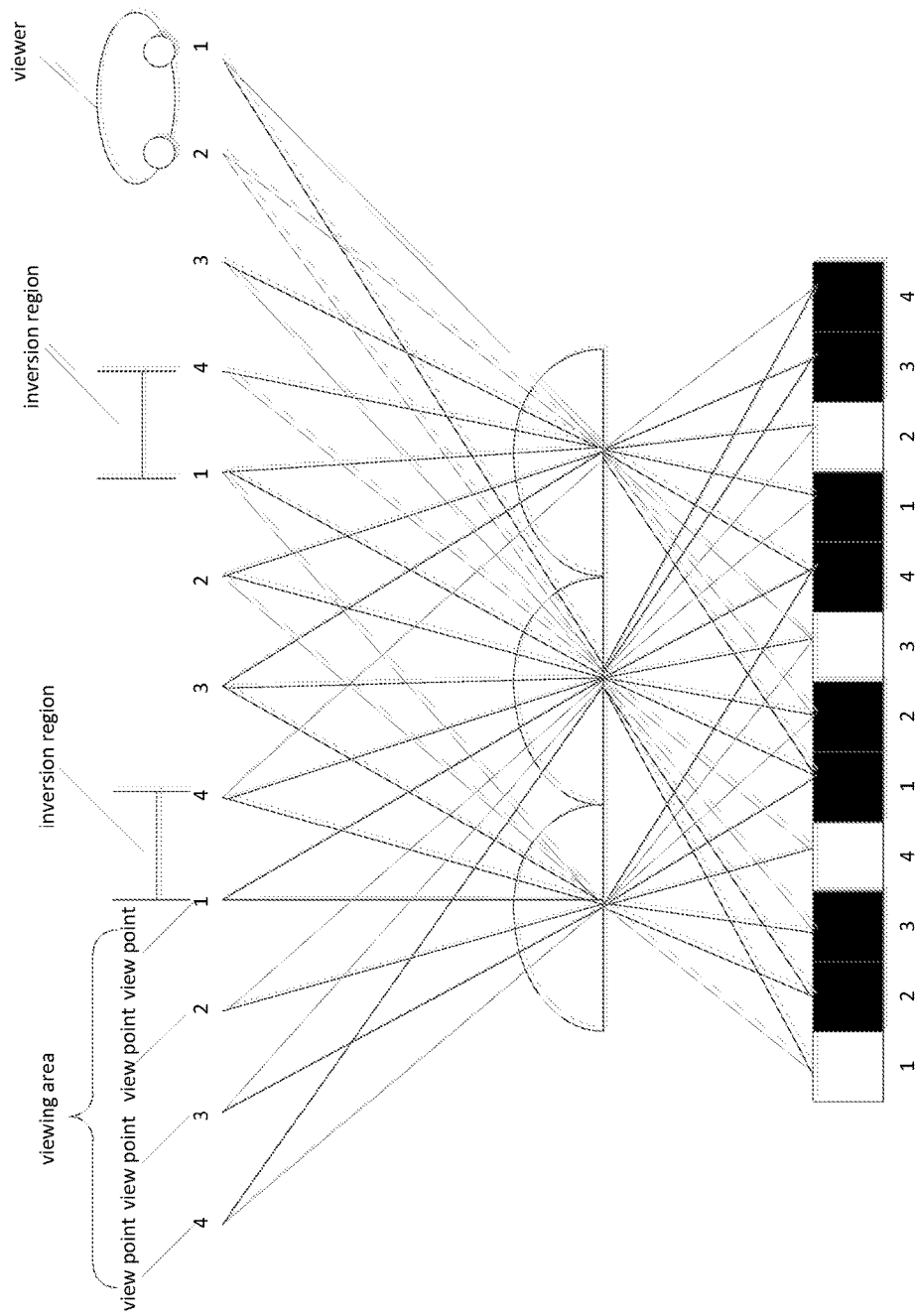
FIG. 4 is a schematic diagram of a conventional stereoscopic display.

FIG. 3 is a flowchart of an image display method for a multi-view stereoscopic display device according to a second embodiment of the present invention. It should be noted that if there are substantially the same results, the method of the present invention is not limited to the sequence of the flowchart shown in FIG. 3. As shown in FIG. 3, the method comprising the following steps:

Step S201: obtaining a position of a viewer.

In the step S201, the multi-view stereoscopic display is periodically disposed with multiple viewing areas along a horizontal direction; each viewing area includes N viewpoints; the viewpoints in each viewing area are sequentially assigned serial numbers from 1 to N; besides, obtaining the position of the viewer is specifically: obtaining the viewing areas containing the viewpoints respectively corresponding to the viewer's left and right eyes.

Step S202: determining that if the position of the viewer is located in an inversion region.

In the step S102, because the distance between the viewer's left and right eyes is about 65 mm, which across multiple viewpoints. When the viewer horizontally moves in the viewing areas periodically disposed along a horizontal direction, the viewpoints corresponding to the viewer's left and right eyes may be located in the same viewing area or in adjacent viewing areas.

Wherein, when the viewpoints corresponding to the viewer's left and right eyes are located in the same viewing area, determining that the position of the viewer is located in a normal region; when the viewpoints corresponding to the viewer's left and right eyes are located in the adjacent viewing areas, determining that the position of the viewer is located in an inversion region For example, the viewer's left and right eyes are separated by K viewpoints, wherein K is a positive integer greater than 1. The viewer horizontally moves in the viewing areas periodically disposed along the horizontal direction. When the serial number of the viewpoint corresponding to the left eye is 1, the serial number of the viewpoint corresponding to the right eye in the same viewing area is K+1; when the serial number of the viewpoint corresponding to the left eye is 2, the serial number of the viewpoint corresponding to the right eye in the same viewing area is K+2; . . . and so on, When the serial number of the viewpoint corresponding to the left eye is N−K, the serial number of the viewpoint corresponding to the right eye in the same viewing area is K. At this time, the viewpoints corresponding to the viewer's left and right eyes are located in the same viewing area, and the position of the viewer is located in the normal region. The viewer continues to horizontally move in the viewing areas periodically disposed along the horizontal direction. When the serial number of the viewpoint corresponding to the left eye is N−K+1, the serial number of the viewpoint corresponding to the right eye in the adjacent viewing area is 1; when the serial number of the viewpoint corresponding to the left eye is N−K+2, the serial number of the viewpoint corresponding to the right eye in the adjacent viewing area is 2; . . . and so on, When the serial number of the viewpoint corresponding to the left eye is N, the serial number of the viewpoint corresponding to the right eye in the adjacent viewing area is K. At this time, the position of the viewer is located in the inversion region. The viewer continues to horizontally move in the viewing areas periodically disposed along the horizontal direction. When the serial number of the viewpoint corresponding to the left eye changes to 1 in the next viewing area, the serial number of the viewpoint corresponding to the right eye is K+1 in the same viewing area. At this time, the position of the viewer changes from the inversion region to the normal region.

Specifically, an example uses each viewing area including 28 viewpoints, and the left and right eyes being separated by 6 viewpoints. When the serial numbers of the viewpoints corresponding to the left eye is 1 to 22 and the serial numbers of the viewpoints corresponding to the right eye in the same viewing area is 7 to 28, the viewer is located in the normal region; when the serial numbers of the viewpoints corresponding to the left eye is 23 to 28 and the serial numbers of the viewpoints corresponding to the right eye area is 1 to 6 in the adjacent viewing area, the viewer is located in the inversion region.

Step S203: When the position of the viewer is located in the inversion region, respectively obtaining the serial numbers of the viewpoints corresponding to the viewer's left and right eyes, and obtaining a serial number of a middle viewpoint selected between the two serial numbers of the viewpoints corresponding to the viewer's left and right eyes.

In the step S203, when the position of the viewer is located in the inversion region, following the example described above, the serial number of the viewpoint corresponding to the viewer's left eye is an arbitrary number of N−K+1 to N, the serial number of the viewpoint corresponding to the viewer's right eye is an arbitrary number of 1 to K in the adjacent viewing area. Wherein, the serial number N−K+1 corresponds to the serial number 1 in the adjacent viewing area, the serial number N−K+2 corresponds to the serial number 2 in the adjacent viewing area, and so on. At an edge location of the inversion region, the serial number N−K+K corresponds to the serial number K in the adjacent viewing area.

Obtaining a serial number of a middle viewpoint selected between the serial number of the viewpoint corresponding to the viewer's left eye and the serial number of the viewpoint corresponding to the viewer's right eye.

Preferably, the serial number of the middle viewpoint is an average value of the serial number of the viewpoint corresponding to the viewer's left eye and the serial number of the viewpoint corresponding to the viewer's right eye. Specifically, when the serial number of the viewpoint corresponding to the left eye is N−K+1 and the serial number of the viewpoint corresponding to the right eye is 1, the serial number of the middle viewpoint is $$\frac{(N-K+1)+1}{2};$$

when the serial number of the viewpoint corresponding to the left eye is N−K+2 and the serial number of the viewpoint corresponding to the right eye is 2, the serial number of the middle viewpoint is $$\frac{(N-K+2)+2}{2};$$

and so on. At an edge location of the inversion region, when the serial number corresponding to the left eye is N and the serial number corresponding to the right eye is K, the serial number of the middle viewpoint is $$\frac{(N-K+K)+K}{2}.$$

The person skilled in this field can understand that when N−K is an odd number, the average value of the serial number of the viewpoint corresponding to the left eye and the serial number of the viewpoint corresponding to the right eye is not an integer. At this time, the serial number of the middle viewpoint can be selected from any one integer of the two integers closed to the average value. Using the serial number of the viewpoint corresponding to the left eye is N−K+1 and the serial number of the viewpoint corresponding to the right eye is 1 as an example, assuming that N=28 and K=7, the average value calculated by the serial number N−K+1 and the serial number 1 is 11.5. The serial number of the middle viewpoint can be 11 or 12.

In another embodiment, the serial number of the middle viewpoint can also be another value different from the average value of the serial number corresponding to the left eye and the serial number corresponding to the right eye. An arbitrary integer can be selected between the serial number corresponding to the left eye and the serial number corresponding to the right eye according to the actual situation.

Step S204: After decreasing the brightness values of the left eye viewpoint image and the right eye viewpoint image by a preset ratio, compensating the brightness values of the left eye viewpoint image and the right eye viewpoint image with a brightness value of the preset ratio of a middle viewpoint image corresponding to the serial number of the middle viewpoint in order to decrease the brightness contrast.

In the step S204, firstly, respectively obtaining the brightness values of viewpoint images of the viewpoints corresponding to the viewer's left and right eyes, and denoting as brightness values of a left eye viewpoint image and a right eye viewpoint image. Then, after decreasing the brightness values of the left eye viewpoint image and the right eye viewpoint image by a preset ratio, respectively compensating the left eye viewpoint image and the right eye viewpoint image with the brightness value of the preset ratio of the middle viewpoint image corresponding to the serial number of the middle viewpoint in order to decrease the brightness contrast such that the brightness of each viewpoint is even in order to decrease the brightness contrast. Wherein, the preset ratio preferably ranges from 1% to 20%.

According to the above example, when the serial number of the viewpoint corresponding to the left eye is N−K+1, the serial number of the viewpoint corresponding to the right eye is 1 and the serial number of the middle point is $$\frac{(N-K+1)+1}{2}.$$

The brightness value of the original left eye viewpoint image is denoted as $V_{N-K+1}$, and the brightness value of the original right eye viewpoint image is denoted as $V_1$. After processing, the brightness value of the left eye viewpoint image becomes $$(1-x\%)V_{N-K+1}+x\%\ V_{\frac{(N-K+1)+1}{2}},$$

and the brightness value of the right eye viewpoint image becomes $$(1-x\%)V_1+x\%\ V_{\frac{(N-K+1)+1}{2}}.$$

When the serial number of the viewpoint corresponding to the left eye is N−K+2, the serial number of the viewpoint corresponding to the right eye is 2 and the serial number of the middle point is $$\frac{(N-K+2)+2}{2}.$$

The brightness value of the original left eye viewpoint image is denoted as $V_{N-K+2}$, and the brightness value of the original right eye viewpoint image is denoted as $V_2$. After processing, the brightness value of the left eye viewpoint image becomes $$(1-x\%)V_{N-K+2} + x\% \ V_{\frac{(N-K+2)+2}{2}},$$

and the brightness value of the right eye viewpoint image become $$(1-x\%)V_2 + x\% \ V_{\frac{(N-K+2)+2}{2}}.$$

and so on.

At the edge location of the inversion region, when the serial number of the viewpoint corresponding to the left eye is N−K+K, the serial number of the viewpoint corresponding to the right eye is K and the serial number of the middle viewpoint is $$\frac{(N-K+K)+K}{2}.$$

The brightness value of the original left eye viewpoint image is denoted as $V_{N-K+K}$, and the brightness value of the original right eye viewpoint image is denoted as $V_K$. After processing, the brightness value of the left eye viewpoint image becomes $$(1-x\%)V_{N-K+K} + x\% \ V_{\frac{(N-K+K)+K}{2}},$$

and the brightness value of the right eye viewpoint image becomes $$(1-x\%)V_K + x\% \ V_{\frac{(N-K+K)+K}{2}}.$$

Wherein, the x % is the range of the preset ratio. The preset ratio ranges from 1% to 20%. $V_M$ is the brightness value of the viewpoint image corresponding to the serial number M of the viewpoint. Wherein, M is an integer selected from 1 to a maximum serial number of the viewpoint in a viewing area.

Specifically, the following example uses each viewing area including 28 viewpoints, and the left eye and the right eye being separated by 6 viewpoints. When the serial number of the viewpoint corresponding to the left eye is 23, the serial number of the viewpoint corresponding to the right eye is 1 and serial number of the middle viewpoint is 12. After processing, the brightness value of the left eye viewpoint image becomes $(1-x\%)V_{23}+x\% \ V_{12}$, and the brightness value of the right eye viewpoint image becomes $(1-x\%)V_1+x\% \ V_{12}$. When the serial number of the viewpoint corresponding to the left eye is 24, the serial number of the viewpoint corresponding to the right eye is 2 and serial number of the middle viewpoint is 13. After processing, the brightness value of the left eye viewpoint image becomes $(1-x\%)V_{24}+x\% \ V_{13}$ and the brightness value of the right eye viewpoint image becomes $(1-x\%)V_2+x\% \ V_{13}$ ... and so on. At the edge location of the inversion region, when the serial number of the viewpoint corresponding to the left eye is 28, the serial number of the viewpoint corresponding to the right eye is 6, and the serial number of the middle viewpoint is 17. After processing, the brightness value of the left eye viewpoint image becomes $(1-x\%)V_{28}+x\% \ V_{17}$ and the brightness value of the right eye viewpoint image becomes $(1-x\%)V_6+x\% \ V_{17}$.

The second embodiment of the present invention through when the position of the viewer is located in an inversion region, decreasing the brightness values of the left eye viewpoint image and the right eye viewpoint image by a preset ratio, and respectively compensating the left eye viewpoint image and the right eye viewpoint image with the brightness value of the preset ratio of the middle viewpoint image corresponding to the serial number of the middle viewpoint such that the brightness of each viewpoint is even and the brightness contrast is decreased. As a result, the present invention can reduce the discomfort of the viewer for watching in the inversion region and add the comfort of watching the stereoscopic image.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An image display method for a multi-view stereoscopic display, wherein,
    the multi-view stereoscopic display includes multiple viewing areas periodically disposed along a horizontal direction; each of the multiple viewing areas includes multiple viewpoints and the number of the multiple viewpoints is the same in the each viewing area, the method comprising:
    obtaining a position of a viewer;
    determining that the viewer is positioned in an inversion region, wherein, the inversion region is the position of the viewer that the viewpoint corresponding to the viewer's left eye and the viewpoint corresponding to the viewer's right eye are respectively located in the adjacent viewing areas; and
    for the viewer that is positioned in the inversion region, executing a preset processing for a left eye viewpoint image of the viewpoint corresponding to the viewer's left eye and a right eye viewpoint image of the viewpoint corresponding to the viewer's right eye so as to decrease a brightness contrast of the left eye viewpoint image and the right eye viewpoint image;
    wherein, the viewpoints in each viewing area are sequentially assigned a serial number; and the step of executing a preset processing for a left eye viewpoint image of the viewpoint corresponding to the viewer's left eye and a right eye viewpoint image of the viewpoint corresponding to the viewer's right eye comprises:
    (a) respectively obtaining series numbers of the viewing points corresponding to viewer's left eye and right eye, and averaging the two series numbers as a serial number of a middle viewpoint;
    (b) respectively decreasing brightness values of the left eye viewpoint image and the right eye viewpoint image by a preset ratio; and
    (c) compensating the brightness values of the left eye viewpoint image and the right eye viewpoint image with the preset ratio of a brightness value of a middle viewpoint image corresponding to the serial number of the middle viewpoint; wherein, the preset ratio ranges from 1% to 20%.

* * * * *